METHOD OF DELAY MODULATION
Filed Oct. 5, 1965 4 Sheets-Sheet 1
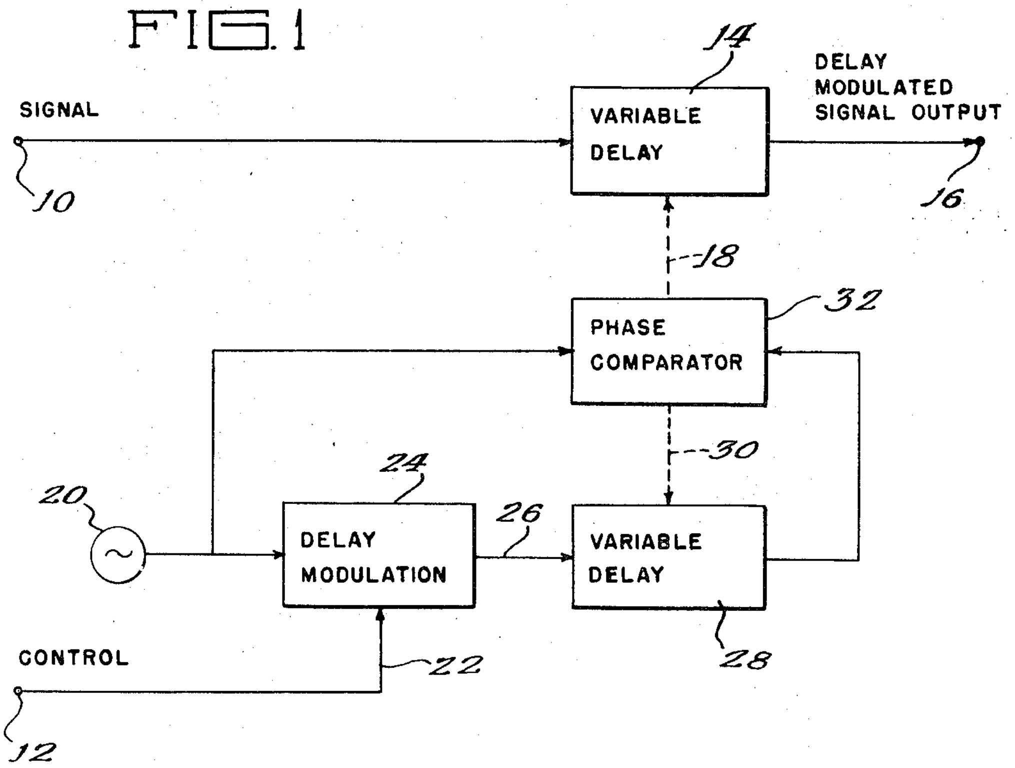
FIG. 2
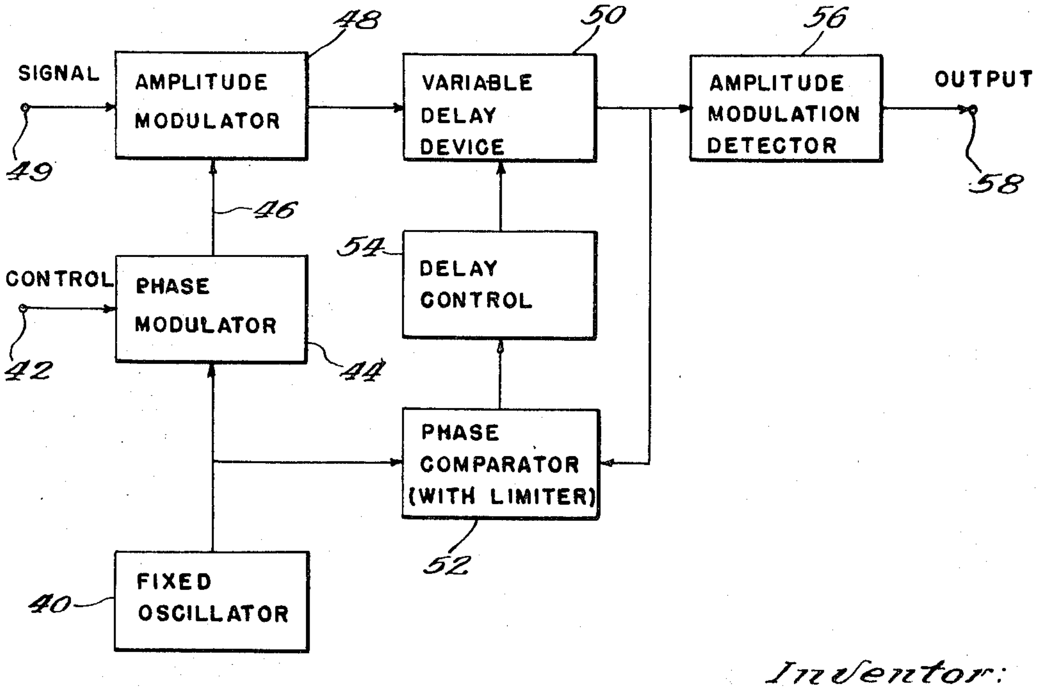
Inventor:
Duane H. Cooper
By: Leonard H. Lieman
Attorney Jan. 26, 1971 D. H. COOPER 3,559,103

METHOD OF DELAY MODULATION

Filed Oct. 5, 1965 4 Sheets-Sheet 2

*Inventor:*
*Duane H. Cooper*
*By: Leonard Nierman*
*Attorney*

METHOD OF DELAY MODULATION

Filed Oct. 5, 1965 4 Sheets-Sheet 3

Inventor:
Duane H. Cooper
By [signature]
Attorney

Inventor:
Duane H. Cooper
By: Leonard G. Nierman
Attorney 3,559,103
METHOD OF DELAY MODULATION

Duane H. Cooper, 804 S. Foley, Champaign, Ill. 61820

Continuation-in-part of application Ser. No. 486,077, Sept. 9, 1965. This application Oct. 5, 1965, Ser. No. 502,805
Int. Cl. H03k 7/00
U.S. Cl. 332—9 21 Claims

ABSTRACT OF THE DISCLOSURE

Signal delay is controlled in accordance with a control waveform by indirect coupling of the control waveform to an electrically variable delay element through a coupling system in which the control waveform is used to produce a pilot waveform which is delay-modulated with respect to a wholly periodic reference waveform. The pilot and reference waveforms are compared and one of them is further delay-modulated to produce substantial identity of the delays and at the same time delay-modulate the signal. Systems employing conventional electrically variable delay elements and systems dispensing with such elements are described.

This application is a continuation-in-part of an application of the same inventor filed on Sept. 9, 1965, Ser. No. 486,077, now abandoned. The invention herein described relates to methods of modulating characteristics of waveforms, and more particularly to methods for modulating the phase or relative delay of instantaneous values of a signal waveform.

In the copending application of the present inventor filed on Mar. 5, 1964, Ser. No. 349,617, now U.S. Pat. No. 3,403,233 there is disclosed and claimed a method of making grooved phonograph records, with precompensation for tracing and tracking errors in which the compensation is effected by delay distortion of the signal being recorded in such a manner that the delay distortion commonly introduced in reproduction is compensated in the recording process. There are therein mentioned, and briefly described, various manners of delay-modulating or delay-distorting the signal waveform in accordance with a control waveform, such as used for other purposes prior to the invention described in the copending application. The present invention lies, in its narrower aspects, in the provision of an improvement in this step or portion of the invention of the earlier application, but in its broader aspects has much wider utility, as will hereinafter be seen.

Variable delay devices for modulating or distorting signal waveforms are used for a number of purposes, particularly in various aspects of the recording arts. In addition to uses in compensation for reproduction errors in disk recording, there are certain errors in tape recording, particularly in the highly critical video recording of color television signals, in which it is necessary to vary the delay of a signal in accordance with the instantaneous value of a control waveform. The latter may be the signal itself (as in the compensation of tracking error), a function of the signal waveform such as its derivative (as in the correction of tracing error as discolsed in the copending application mentioned), or, more generally, any other control waveform.

For these and other purposes, the device in most common use is the variable delay line. Various forms of variable delay line are known. In forms of variable delay line in which the delay is continuously variable in accordance with the control waveform, the region over which the delay is a linear function of the control signal is limited, as is, correspondingly, the region in which the sole effect of the control waveform on the signal waveform is that of delay, i.e., the region in which the delay line produces no amplitude distortion in the process of delay variation. Accordingly, variable delay line constructions in commercial use are often varied in discrete intervals, rather than continuously. In such variable delay lines, whether continuous or otherwise, the control signal is applied to a suitable input and produces the variation of delay either by altering the length or signal velocity of the line in some continuous fashion, or by switching the signal input or takeoff between suitable taps on the lumped-constant or distribtued line.

Such variable delay lines are difficult and expensive to design and construct in such a manner as to give the desired result of delay variation which is proportional to the instantaneous value of the control voltage and yet introduces no distortion of the signal waveform other than the desired delay. Factors such as nonlinearity of the relation between delay and control voltage may be compensated by pretreatment of the control waveform to produce compensating distortion, but the provision of such compensation requires either very great precautions against instability of both the line and the nonlinear compensation, or the system must be continually "tuned up" to restore proper operation in the face of small drifts.

In view of these difficulties, numerous attempts have long been made to provide a more fully satisfactory manner of achieving variable delay in response to a control voltage, there being many uses for such a system which are presently commercially impractical because of these and similar limitations. Electrical-mechanical delay systems such as those varying the delay or phase of a signal by motion of a transducer such as a tape-recording head are subject to generally similar limitations for widespread use.

The present invention provides a novel method of signal-treatment for the production of such modulated delay of signals. In one aspect, the invention may be employed with variable delay devices heretofore known to eliminate problems of nonlinearity of relation between control voltage and delay without requiring compensating nonlinearity; at the same time, the present invention eliminates the effects of instabilities or changes in the relation between control voltage and delay time when such prior art delay devices are employed. In addition, the novel method of the present invention, in another aspect, permits the complete elimination of variable delay lines and similar special equipment heretofore employed for electronic control of delay of instantaneous signal values, the entire signal treatment being carried out with conventional and noncritical electronic circuits of designs well known for other purposes.

The present system, in essence, eliminates the difficulties of controlling the delay of waveforms of varying shape, such as audio or video signals, by employing a "pilot" waveform to which the variable delay may be readily applied by well-known techniques of modulation applied to a uniform periodic reference waveform. The delay or phase-modulated pilot waveform so produced is then compared with the original reference waveform and this comparison is employed for production of correspinding delay modulation of the signal waveform in a variable delay line or similar device as heretofore known. This is done by simultaneously and identically delay-modulating the signal waveform and one of the two compared waveforms, for example by simultaneous treatment in the same delay line, in response to the comparison, to null the phase or delay differences produced by the original conventional modulation.

The null or feedback control of signal delay thus produced eliminates the problems of stability and linearity of response and permits the use of variable delay devices otherwise completely unsuitable for such uses as precompensation for tracing and tracking errors.

In one form of the method, each cycle of the modulated pilot waveform is delayed by an amount complementary to its original delay, the amount of delay so required being determined in response to the original unmodulated reference signal, i.e., the second delay being determined by resynchronization of the delay modulated pilot signal with the original reference waveform. The signal waveform is identically and simultaneously delayed with this second modulation or delay of the pilot signal. Thus the delay of the signal waveform is the complement of the delay which originally formed the pilot waveform from the reference waveform, i.e., the signal waveform is delay-modulated in accordance with the control waveform. As will be seen, a "positive" delay in the pilot waveform produces a "negative" delay of the signal waveform. However, as will be seen upon study, this merely represents a polarity reversal in the translation of control voltage to signal delay, and does not affect the correspondence in any manner requiring alteration of the control waveform to produce the desired correspondence of delay thereto.

In another form of the method, the modulated pilot waveform is left unaltered, and the reference waveform is delay-treated along with the signal waveform to produce a further delay-modulated waveform which is brought into correspondence with the pilot waveform by the null control.

From this brief description, it will readily be observed that there are a large variety of detailed manners in which the invention may be practiced for modulation of delay. The general method may also be employed in modulation of characteristics other than delay, where analogous problems are encountered in direct modulation of a signal.

The invention in its narrower aspects provides a novel utilization of the general method as described above to permit delay modulation for purposes such as phonograph compensation with conventional electronic circuits heretofore used for other purposes, the general method being implemented in a manner eliminating the requirement of variable delay lines or similar devices entirely. For better understanding of the invention in its various aspects, reference is made to the particular embodiments illustrated in the drawing and described below.

In the drawing:

FIG. 1 is a block diagram illustrative of one general form of the method of the invention;

FIG. 2 is a block diagram showing one manner of practice of the form of the invention shown in FIG. 1, employing a variable delay device such as those heretofore known;

Figure 3:
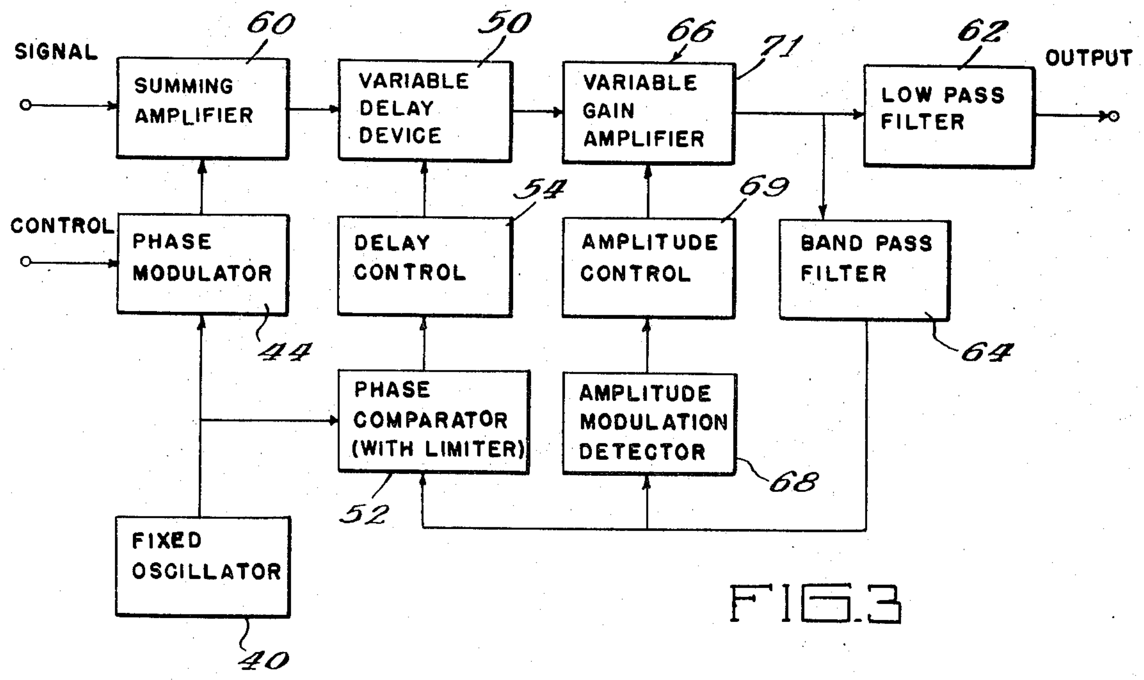
FIG. 3 is a block diagram showing another manner of practicing the invention with a conventional variable delay device.

FIG. 1 shows one form of the general method of the invention in a manner facilitating understanding of the basic underlying operation of specific embodiments to be described later. As there shown, the system has a signal input terminal 10 and a control input terminal 12. The signal is subjected to variable delay at 14, controlled by the control waveform, and the output at 16 represents a delay-modulated or delay-distorted modification of the input signal. As thus far described, the system is conventional, the difference from prior systems for such purposes lying in the manner in which the control input at 12 is reproduced as delay at 14. For present purposes, the delay device at 14 will be considered as being of a type heretofore used for such purposes, such as a variable delay line having a control-signal input shown at 18; in conventional systems, the control waveform at 12 is directly impressed at 18, with predistortion for nonlinearity of correspondence between value of the control at 18 and value of the delay thereby produced, if required.

In the present method, there is provided a reference waveform produced by a suitable oscillator 20 which is of considerably higher frequency than the highest frequency in the control waveform which is to be reproduced as delay of the signal under treatment. The system is of maximum utility where the control waveform contains frequencies of the same order as, or higher than, the frequencies in the signal under treatment, since it is the rapid modulation of delay in small portions of the signal waveform that presents the greatest difficulty in meeting the requirements of such uses as tracing and tracking distortion, etc. Accordingly, the maximum utility of the general method shown in FIG. 1 is achieved when the reference waveform is of substantially higher frequency than any component of the signal waveform.

The control waveform is fed to the modulation input 22 of a delay modulation device 24, in which the constant-phase reference waveform is modulated in phase or delay to produce at its output 26 a "pilot" signal. It will be observed that the delay modulation device 24 is in certain respects functionally similar to the variable delay device 14. However, the difference in the type and frequency of the signal being delayed makes the actual construction of the modulation device 24 a matter of complete simplicity, there being a large number of well-known electronic circuits in which the step or function represented at 24 may readily be performed, used for other purposes. Delay or phase modulation of uniform waveforms such as the reference waveform, at frequencies of modulation substantially below the "carrier," is routine for many purposes, and any circuit or device commonly used for such purposes may be employed for wide-range phase or delay modulation of the uniform reference signal to produce the pilot signal. The pilot signal at 26 is in turn introduced at the input to a variable delay device 28 which is completely identical in all respects to the device 14, including a control input 30 corresponding to the control input 18 of the latter. The control input 30 to the variable delay device 28 is fed by the output of a phase-comparison circuit 32 which compares the phase of the reference waveform and the output of the variable delay device 28 and produces an output at 30 which varies the delay of the device 28 in the appropriate direction to restore the in-phase relation of the two inputs to the phase comparator. The latter type of circuit is again very well known for purposes such as frequency or phase stabilization or synchronization.

The result of the feedback loop by which the delay at 28 is varied in response to deviations of the output from the reference phase is, overall, the removal, from the output of the delay device 28 of the delay modulation of the pilot waveform. With sufficient amplification and speed of response, this loop can be made to substantially remove all phase or delay variations in the output from the device 28. In essence, this is accomplished by delaying each cycle of the pilot waveform by an amount complementary to the amount by which it was delayed in the modulation at 24.

The output waveform of the comparator 32 which produces this result at 30 is simultaneously applied at 18 for control of the delay in the device 14. Thus the signal waveform is delayed by amounts complementary to the delay modulation occurring at 24. It will be understood that the term "complementary" refers to the fact that there is some constant overall delay (some substantial number of cycles of the reference waveform) between the input to the delay modulator 24 and the output of the variable delay 28, this total delay being divided between 24 and 28 in accordance with the control signal. It will be seen upon study that if the delay devices 14 and 28 are fully linear in their operation, as is the modulator 24, the waveform at the output 18, 30 of the phase comparator 32 is a reproduction of the control waveform, but delay modulated in accordance with its own waveform values and also reversed as to polarity, i.e., increasing the delay in 14 and 28 when the control waveform is decreasing the delay in 24. Thus the "complementary" relation merely represents a reversal of polarity in applying a control waveform at 12 in the illustrated system, apart from the necessary self-modulation in delay because of the feedback, as compared with direct application at 18 as in prior art devices. In most applications, delay control by a self-delay-modulated version of the control waveform is the desired correspondence between the control waveform and the delay variations so contorlled. For special applications, if desired, the method described may be used to premodulate the control waveform itself in delay in a sense complementary to that which it subsequently undergoes by virtue of the inherent feedback of the method. An alternate manner of achieving this special effect when desired will be explained hereinafter in connection with a further embodiment of the invention.

More importantly, the delay produced in 14 follows the control waveform irrespective of any non-linearities of delay as a function of control voltage which may exist in the devices 14 and 28, or any drift in their characteristics, so long as the operation of these two devices is identical.

In practical utilization of the method shown in principle in FIG. 1, it is unnecessary to employ twin matched delay devices, this mode of illustration of the basic method being adopted primarily for conceptual clarity of the signal-delay function and delay control function which are served by a single element in most (but not necessarily all) practical applications. One system employing a single variable delay device is shown in FIG. 2. As here shown, the reference waveform is provided by a fixed oscillator 40 modulated in phase or delay by the control waveform impressed at input 42 to a modulator 44, as in FIG. 1. Here, however, the pilot signal thus constituted is fed at 46 to an amplitude modulator 48 in which its amplitude is modulated by the signal waveform impressed at input 49. The output from the modulator at 48 thus consists of the phase-modulated pilot waveform and the signal waveform, the latter being present as the "envelope" of the amplitude modulation. The delay of this composite signal is performed in the single variable delay device 50 and the comparator 52 compares the phase of the double-delayed pilot waveform with the reference waveform and its output is impressed on the single delay control 54; a limiter is employed to eliminate possible adverse effects of the amplitude modulation on the phase comparison. The delay device 50 thus produces complementary delay of the pilot waveform just as in the previous embodiment. An amplitude modulation detector 56 accordingly feeds the delay-modulated or delay-distorted signal waveform to the output 58. Basically, it will be seen that here again there is division or sharing of a fixed total delay between the modulator 44 and the variable delay device 50, but the signal is inserted in this combination between these two devices, so as to be delayed only by the latter.

FIG. 3 shows a somewhat similar utilization of the method in which the signal waveform is inserted at the same place as in FIG. 2, but is introduced in a summing or linear manner at 60, the input to the variable delay device 50 thus consisting of the pilot waveform and the signal waveform free of the sum and difference frequencies characteristic of modulation. Separation of the pilot waveform (as modified by the second delay to restore the original reference waveform) and the delayed signal waveform at the output is in this case accomplished by simple filters 62 and 64. Except for an additional use made of the pilot signal in a compensation system designated generally 66, to be described below, other elements are essentially the same as in FIG. 2, and are accordingly shown with corresponding reference characters in FIG. 3.

The compensation circuits at 66 are employed for the purpose of eliminating a further difficulty frequently encountered with variable delay lines, particularly those of reasonably simple construction. It has previously been shown that the present method makes it unnecessary that the variable delay device for delaying the signal be either linear or highly stable in its variation of delay in accordance with the value of the control voltage impressed on it. An additional problem contributing to complexity and expense of such devices lies in making the output signal amplitude independent of delay or "length." The control of attenuation to a degree permitting substantial variation of length without substantial variation of attenuation is difficult and expensive, whether the variation be continuous or stepwise. In FIG. 3, the amplitude of the pilot waveform (which is modulated only to the extent that such modulation is inherent in the variation of delay of the device 50) is used for automatic gain control. The amplitude of the pilot waveform is detected at 68 and the detected modulation is fed to a control circuit 69, including such amplification as is appropriate, and this control signal varies the gain of an amplifier 71 interposed between the output of the variable device 50 and the filters 62 and 64, thus equalizing or compensating for changes in attenuation of the delay device 50, either with changes in controlled delay or otherwise.

Figure 4:
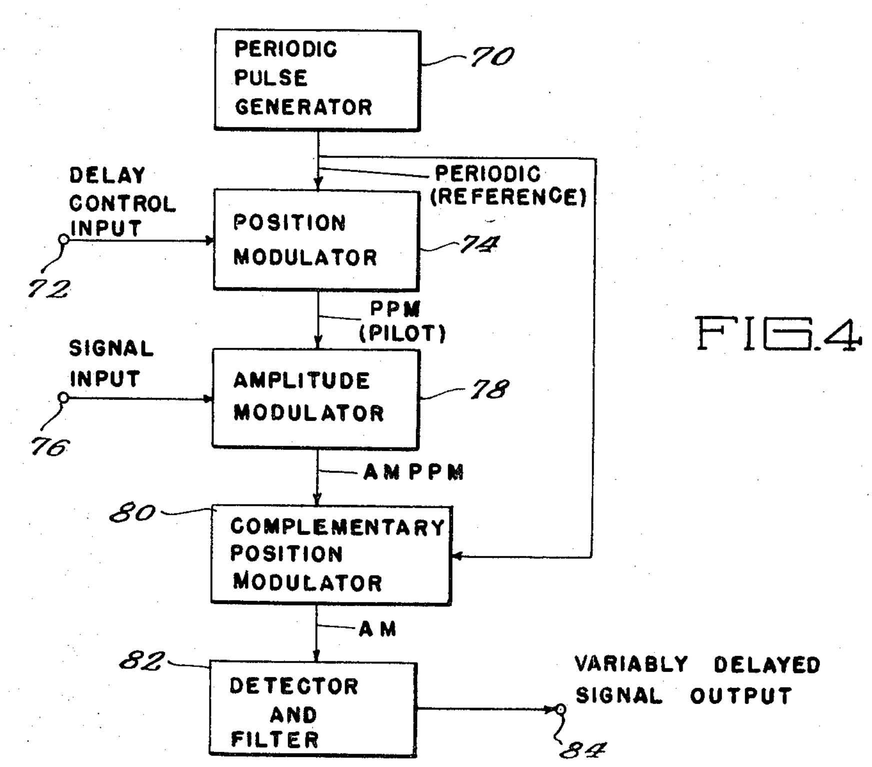
FIG. 4 is a block diagram or process chart constituting a modified form or embodiment which requires no special components such as variable delay lines.

Thus far, the type of waveform employed as the reference and the pilot have not been discussed. The systems as thus far described are generalized in this respect, and may employ simple sinusoidal oscillators with phase modulators of any well-known type designed for use therewith. In general, such type of construction may be found advantageous where variable delay devices of the type heretofore employed for such purposes, such as electronically variable delay lines, continuous or tapped, are used. However, as earlier indicated, the invention permits complete elimination of such uncoventional circuit components. FIG. 4 shows one manner in which this may be done.

In FIG. 4, the reference waveform is a periodic pulse generator 70. The waveform impressed at the delay control input 72 controls a position modulator 74 to produce a pulse-position-modulated pilot which is amplitude-modulated from the signal input 76 in a suitable form of modulator 78. This signal is fed to a complementary position modulator 80 which restores the original equal spacing of the pulses by suitable synchronization control by the reference pulses. The position modulator 80 alters the relative positions to restore the equal periodic relation while preserving the amplitudes of the pulses thus altered in time. There results an amplitude modulated periodic pulse signal which is fed to a detector and filter 82 to produce the modulated signal output at 84. Such a system will be seen to require no variable delay lines or similar special equipment. The complementary delay modulator at 80 may be of a number of forms. In the conceptually simplest form, this portion consists merely of a storage device which receives the successive position-modulated pulses of varying amplitude and releases them one-by-one in their original sequence on each occurrence of a reference pulse.

To produce delays which are appreciable portions of the low-frequency signal being processed, such a system must be capable of storing a substantial number of the high-frequency pulses. The mean rate of reception of position-modulated pulses is of course equal to the reference repetition rate. When the delay control input is zero, the amplitude modulated pulses will be released from the storage device in synchronism with their reception, so that the number stored remains constant. As the control voltage varies, the number of pulses stored likewise varies. As the control voltage moves to a value producing a "negative delay" in the pulse position (representing positive delay of the signal at the ultimate output), the number of pulses in storage increases, stabilizing at a new value when the derivative of the control voltage becomes zero (control voltage steady or at a maximum). Similarly, when the control voltage moves in the opposite direction, the pulses in the storage are depleted, the original number being restored as the control voltage goes through "zero," and being further depleted as "positive delay" of pulse position is increasingly produced. The average or mean number of pulses stored must accordingly be the number corresponding to the maximum signal delay to be produced (full depletion of the storage), and the system must have a storage capacity of at least twice this number. The storage and subsequent release on "command" of the reference pulses may readily be achieved by well-known computer techniques in a variety of ways. Alternatively, special types of memory devices designed for the purpose may be used, such as multichannel endless magnetic tapes with commutated read-in and read-out.

However, there has been devised in accordance with the invention in its narrower aspects, a much simpler detailed form of the method as regards achieving the desired result with simple equipment. In this system, shown in FIGS. 5 and 6, the necessity for any complex storage device is eliminated by the combining of the position modulation, the amplitude modulation, and the complementary position modulation in a manner utilizing the fact that the relative delays with respect to each other of any given group of pulses in such a system as just described is much smaller than the maximum delay with respect to the reference signal, thus permitting a cyclic type of operation in which it becomes unnecessary to provide any substantial storage. This system is illustrated schematically in FIG. 6. As there shown, the control waveform at 90 and the input or signal waveform at 92 are impressed in parallel on a series of channels 94, 96, etc., which produce sequential output pulses in synchronism with sequential reference pulses as hereinafter explained, these output pulses being summed or mixed at 98 and forming a periodic pulse train amplitude modulated in accordance with the delayed signal waveform, the filtering out of the high frequencies at a filter 100 leaving the desired delay-modulated signal output at 102. The reference waveform is provided by a timing generator and distributor system 104 of conventional design producing successive pulses on sequential output lines 106, 108, etc., to the respective channels 94, 96, etc., this pulse distribution recycling continuously. Each channel has a circuit herein referred to as a "skew sampler" which has an input from the control waveform 90 and an input from the timing generator system as already described. The output of each skew sampler 110, 112, etc., is a pulse coupled to a respective "boxcar sampler" 114, 116, etc., which is coupled to the signal input terminal 92 and also receives the timing pulses as distributed to that channel.

The manner of overall operation and the function of the pulse distribution to the sequential channels are best understood from consideration of the operation of a single channel, such as 94.

The boxcar sampler 114 is a circuit which is farily well known in uses such as analog-to-digital conversion, being actuated by a pulse at its "start" input to produce a signal (such as the charge on a condenser) proportional to the instantaneous value then existing of a voltage at its input. This charge is held until a pulse is received at its "dump" input, at which time the circuit produces an output pulse proportional in amplitude to the earlier-received sample. Such circuits are used, for example, in storing pulse amplitudes awaiting conversion to digital values in devices such as multi-channel pulse analyzers, and are well known.

Figure 5:
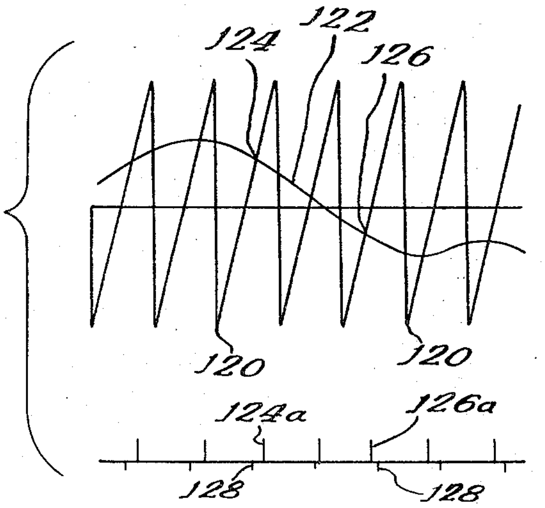
FIG. 5 is a series of voltage diagrams schematically showing a particular manner of position modulation corresponding to a portion of FIG. 4.

The skew sampler is generally similar to a device called the "serrasoid modulator," described in a paper by Day in Electronics, volume 21, pages 72 to 76, October 1948. The operation of this element is quite simple, and is illustrated in FIG. 5. As there shown, a sawtooth wave of the type commonly known as a "ramp" in various computer arts is initiated at 120 on each occurrence of a periodic pulse (not shown); a control signal of arbitrary waveform 122 is continuously compared with the "ramp." When the ramp reaches a value corresponding to the instantaneous control value, as shown at 124 and 126, for example, a pulse is emitted. The time displacement of this pulse with respect to the reference pulses accordingly corresponds with the instantaneous control value. The device is thus basically a pulse-position modulator. As shown in the lower portion of FIG. 5, the pulses **124*a* and 126*a*, produced at the times mentioned above as examples, are appropriately displaced in phase from the markers 128, shown as midway between successive pulses 120 at which ramps are initiated, and thus corresponding to the unmodulated pulse positions, in the illustrated example. It will thus be seen that when a reference pulse appears on the line 106, there is started a ramp voltage which increases linearly until it reaches a value corresponding to that of the control waveform at 90. At this point, a pulse is emitted from the skew sampler to start or actuate the boxcar sampler 114, which takes the instantaneous value of the signal waveform input at 92 as then existing and holds it until the next occurrence of a pulse on the line 106, which serves as the "dump" signal producing at the output of the boxcar the signal sample information earlier obtained. At the same time, of course, a new ramp is started in the skew sampler 110** to start the cycle over.

Thus the output of the channel 94 consists of amplitude-modulated pulses of equal phase, the amplitude of each pulse corresponding to the amplitude of the input signal at some earlier time, one-half the pulse interval if the control voltage was zero, less if it was positive, more if it was negative, the delay of the output pulse with respect to the signal waveform value which it represents being proportional to the value of the control voltage. The output of the channel 94 thus consists of pulses whose amplitudes represent signal values which are delayed with respect to the time of their actual occurrence by an amount which is variable over a full pulse interval. In principle, the amplitude information can be extracted to form a signal, but actually no meaningful signal can be constructed from such a channel, without due regard for the frequency of operation to be chosen with respect to the signal frequency being sampled.

It is basic to the theory of sampling or modulation that reconstitution of a signal cannot be made from samples taken at a frequency smaller than twice the highest frequency present in the sampled signal. It will of course be understood that the term "highest frequency" as herein used refers only to frequency components which are of significance in the particular signal-treatment process, i.e., to the highest frequency component of the signal waveform and the control waveform which it is desired to produce in the modulated output; in cases where the delay distortion produces higher desired frequencies in the output than in either input, the sampling frequency must of course be sufficiently greater than this minimum to produce the desired output fidelity. Likewise, as is well known in generally similar connections, the sampling or "carrier" frequency must be sufficiently higher to prevent the appearance, in the reconstitution of the output waveform, of spurious or "alias" frequency components of substantial amplitude.

Where delays which may be a substantial multiple of the period of the highest frequency are required, as is true in correcting tracing and tracking errors and most other applications of variable delay devices, a system having a maximum positive or negative delay of half the sampling time cannot produce the desired result. In accordance with the present invention, this difficulty is overcome by providing a series of such channels ($n$ in number), sequentially interlaced and each of unmodulated pulse interval $np$ to form an overall pulse repetition rate of period $p$ meeting this frequency requirement, but leaving the delay variation in each channel a large multiple of the pulse interval $p$ of the reference signal and the composite output signal. The maximum interval between occurrences of pulses in successive channels is less than two periods of the reference pulse interval, but pulses may be delayed by a multiple ($n$, the number of channels) of the reference pulse interval $p$. For a phonograph-compensation system such as disclosed in the copending application, an overall pulse reference frequency of 140 kc., with a 7 kc. pulse repetition rate in each of 20 channels, is suitable from the standpoint of acceptable "alias" frequency output components.

It will be observed that it appears theoretically possible that an output pulse from one channel would be representative of a signal amplitude at a time actually earlier than the time represented by the output amplitude of the last preceding channel. However, it will be seen upon study that this cannot happen in a practical case where the control waveform and the signal waveform are of generally similar frequency characteristics, since such an occurrence would imply that the control waveform is varying at a rate corresponding to frequencies which cannot be present.

It will further be observed that the skew sampler produces the result that the values of the control waveform effective in fixing the delays in the train of position-modulated pulses are those values occurring at the same instant as each pulse actually occurs. This is, of course, in exact correspondence with simple modulation theory, the value of the modulation at any instant agreeing with the value of the modulating waveform at the corresponding instant. Thus, because of the inherent delay-modulation of the control waveform produced by the modulation of sampling interval, it is actually a self-delay-modulated version of the control waveform which controls the delay modulation of the signal waveform. However, if desired, a boxcar sampler may be used for the control waveform, the "start" and "dump" functions being controlled by the sequential reference pulses for each channel, these "held" values of the control waveform being supplied to the skew sampler to control the position modulation. With such construction, the control values actually effective in fixing the delays in the train of position-modulated pulses are the values occurring in synchronism with the reference pulses; with such construction, the delay modulation is slightly distorted as regards the time relation characterizing simple modulation, but for some purposes such a mode of operation may be desirable.

Figure 6:
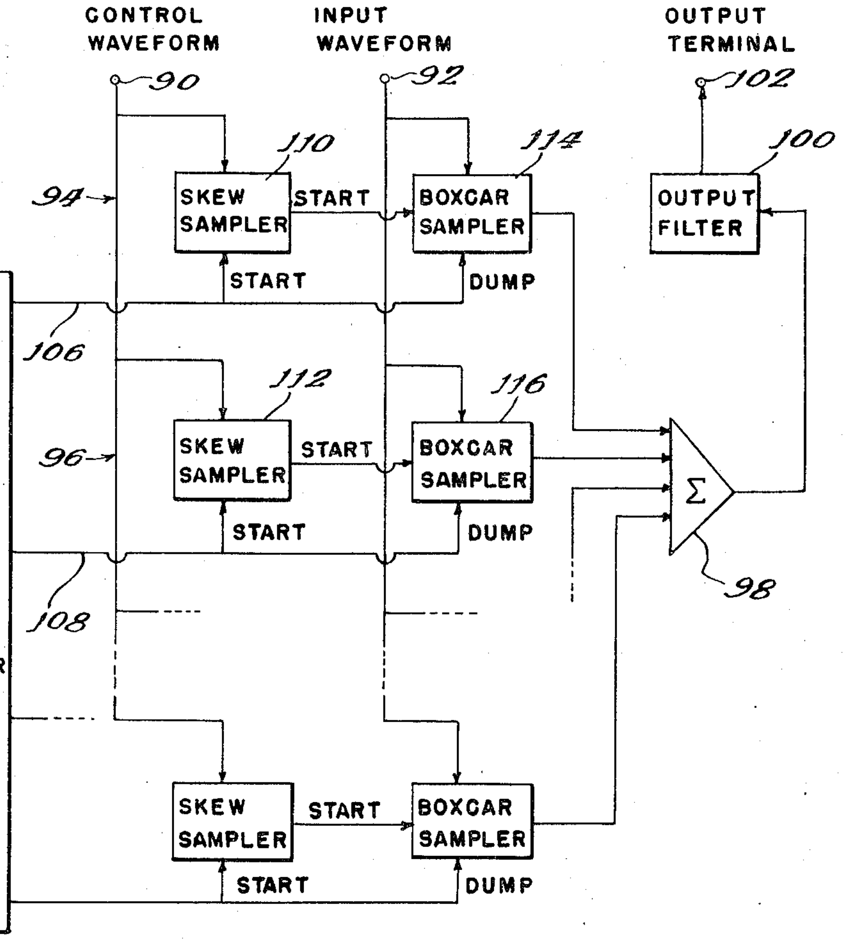
FIG. 6 is a schematic block diagram showing a full system incorporating the aspect of the invention illustrated in FIGS. 4 and 5.

The system of FIG. 6 will be seen upon study to be functionally describable as a stage or bank comprising the skew samplers, position-modulating the reference pulses in accordance with the control waveform, and a stage or bank comprising the boxcar samplers, sampling the signal waveform value at the time of each occurrence of a position-modulated pulse to effectively delay the pulse in amplitude-modulated form for subsequent release in the original equal-interval relation. The boxcar sampler bank may, of course, be used with a single-channel input of position-modulated pulses formed in some other manner, by appropriate sequential distribution, but with sacrifice of the simplicity provided by the pre-distributed output of the type of pulse-position modulator here employed.

The embodiments of the invention thus far described are of the general form shown in FIG. 1, in which the modulated pilot signal is remodulated in response to the comparison, i.e., in which the null is produced between the original reference waveform and the double-modulated pilot waveform. In the general form of the method shown in FIG. 7, the reference waveform, rather than the pilot waveform, is delay-modulated along with the signal waveform.

Figure 7:
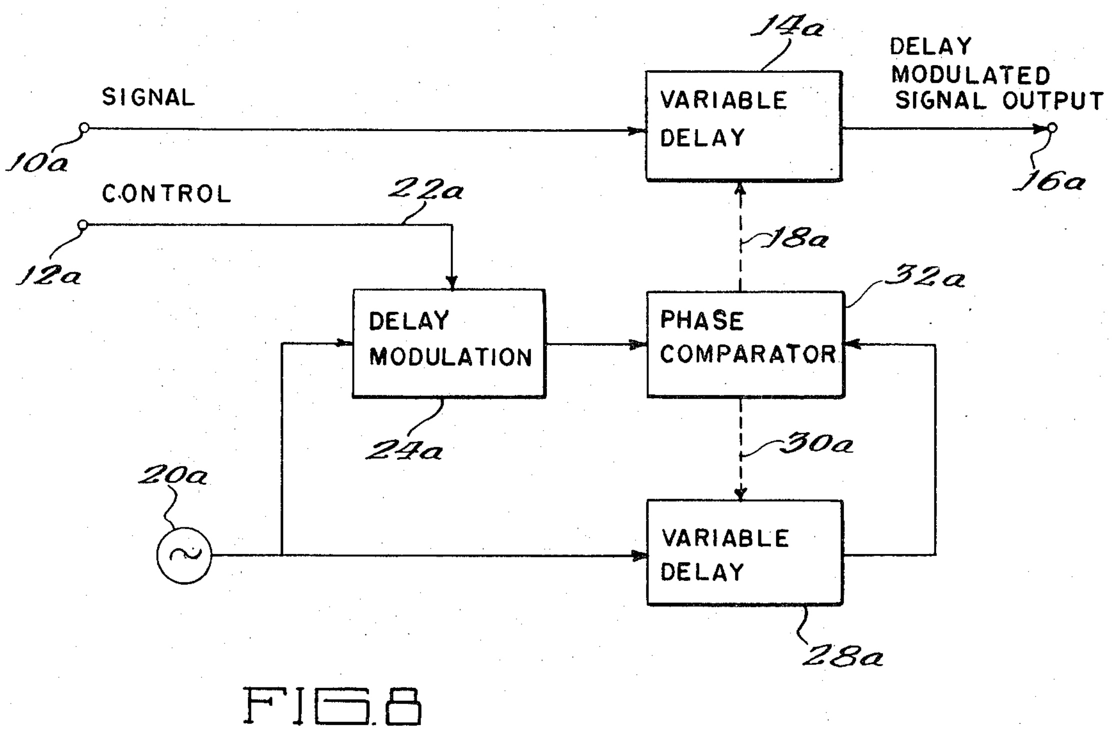
FIG. 7 is a block diagram similar to FIG. 1, but illustrating another general form of the invention.

The elements shown in FIG. 7 are designated by reference characters corresponding to those of FIG. 1, with the addition of the designation "*a*." In this form of the method, in essence, the input connections to the phase comparator 32 and the variable delay 28 of FIG. 1 are reversed in forming the input connections of the comparator **32*a* and variable delay 28*a*. It will be seen upon study that this form of the method, although producing a generally similar modulation of the signal waveform, does not produce a modulation which is identical to that produced by the system of FIG. 1. The difference lies in the fact that in FIG. 1, the comparator output at 18 or 30 is delayed with respect to the control signal at 22 by reason of the passage of the modulated pilot signal through the variable delay 28. The value of the variable delay at any instant is determined by an instantaneous control value which occurred earlier, i.e., the value of the delay at 14 is controlled by a control signal which has itself effectively been delayed in the delay 28. In the system of FIG. 7, this is not the case, the comparator 32*a*** producing an output which is responsive to the value of the control voltage at that same instant. Accordingly, for uses such as tracing and tracking compensation, the system of FIG. 7 is in general less desirable. However, as mentioned above in connection with a variant of FIG. 6, the control of the delay in a manner which is not self-modulated as to delay may be desirable in certain instances.

Figure 8:
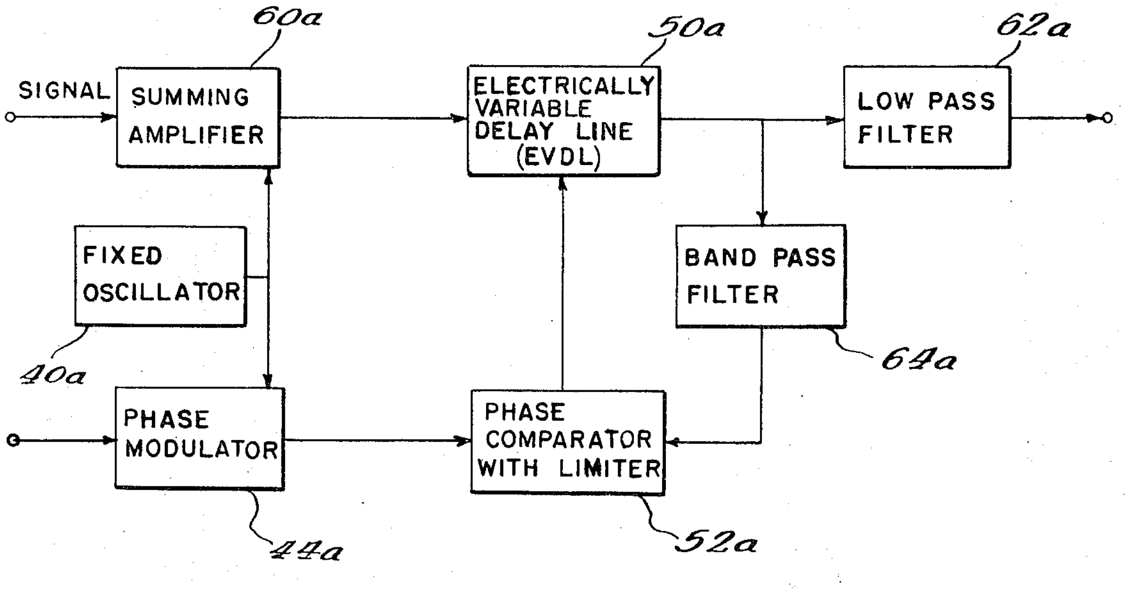
FIG. 8 is a block diagram showing an illustrative manner of practicing the general method of FIG. 7.

FIG. 8 shows an exemplary embodiment of the form of the invention illustrated in FIG. 7. The elements of this embodiment are generally similar to those of FIG. 3 (except for the omission of the gain compensation elements of FIG. 3) and corresponding reference characters are again employed with the designation "*a*." The element **50*a* is designated in the drawing more specifically as an electrically variable delay line (EVDL). The system of FIG. 8 will be seen in essence to differ from that of FIG. 3 (neglecting the gain compensation provision) in the reversal of the location in the systems of the oscillator 40 and phase modulator 44, in the one case, and the oscillator 40*a* and phase modulator 44*a***, in the other case, and to produce the same operation, with the difference already discussed in connection with the comparison of FIGS. 1 and 7.

The teachings of the present invention will of course find many uses beyond those described in the copending application earlier mentioned, but are nevertheless advantageous in practice of the earlier invention, and the method of the present invention is hereby disclosed by reference as a part and portion of the methods described in copending application, Ser. No. 349,617, filed Mar. 5, 1964, of the same inventor the disclosure of which is hereby incorporated by reference.

Certain teachings of the invention relating to the use of a reference and pilot signal for control of alteration of delay characteristics will equally well be applied by persons skilled in the art to alteration of other characteristics of a signal, such as amplitude. The invention in its broader aspects may be used in any instance in which a characteristic of a signal waveform to be varied or controlled is more simply varied or controlled as a characteristic of another waveform, which may then be chosen as the reference waveform, the result of applying the variation serving as the pilot waveform; the subsequent adjustment of this characteristic to remove the variations from the pilot waveform, by comparison with the reference waveform, or to produce similar variations in the reference waveform, by comparison with the pilot waveform, may be made the basis for accurately introducing these same variations, in a complementary or direct manner, in the same characteristic of the signal waveform, using simple characteristic-variation devices or circuits unsuited for conventional direct use on the signal waveform.

Accordingly, the embodiments illustrated in the drawing and described above are merely illustrative of a large number of variants which may be employed in utilizing the invention. Thus the scope of the patent protection to be afforded the invention should not be considered as limited by the particular embodiments disclosed herein, but should extend to all practices of the method of the invention as described in the appended claims, and equivalents thereof.

What is claimed is:

1. A method of delay-modulating a signal waveform in accordance with a control waveform comprising the steps of:
- (a) generating a periodic pulse waveform of frequency at least twice that of the highest frequency component of both the signal and control waveforms,
- (b) altering the successive pulse intervals in accordance with the control waveform to produce a position-modulated pulse waveform,
- (c) modulating the pulse amplitude of the position-modulated waveform in response to the signal waveform,
- (d) realtering the pulse intervals of the pulses so amplitude-modulated to restore the original periodicity of the periodic pulse waveform, and
- (e) producing a delay-modulated signal waveform in accordance with the resultant amplitude modulation.

2. The method of claim 1 wherein the maximum altered pulse interval is less than two periods of the unmodulated periodic pulse frequency but the aggregation of successive altered pulse intervals delays the occurrence of some pulses by a time substantially greater than a period, so that the maximum delay modulation may substantially exceed the period of high-frequency components of the signal waveform.

3. A method of delay-modulating a signal waveform in accordance with a control waveform comprising the steps of:
- (a) generating a periodic pulse waveform of period $p$ at most half that of the highest frequency component of both the signal and control waveforms,
- (b) cyclically distributing each successive pulse into a successive one of $n$ channels to form $n$ periodic pulse waveforms of period $np$, with phase displacement equal to $p$,
- (c) delaying the pulses in each channel in accordance with the value of the control waveform, with a maximum delay substantially exceeding $p$ but less than $np$,
- (d) amplitude-modulating the delayed pulses in each channel in accordance with the value of the signal waveform at the time of occurrence of each pulse,
- (e) delaying the amplitude-modulated pulses in each channel by the difference between the first delay thereof and $np$ to restore the original periodicity and phase in each channel,
- (f) combining the pulses of all channels into a single pulse waveform to produce an amplitude-modulated periodic pulse waveform of period $p$, and
- (g) removing from said periodic pulse waveform at least all frequencies of period less than twice $p$ to produce a delay-modulated signal therefrom.

4. The method of claim 3 wherein the first delay of each pulse is responsive to the value of the control signal at the time of an undelayed pulse.

5. The method of claim 3 wherein the first delay of each pulse is responsive to the value of the control signal at the time of occurrence of the delayed pulse.

6. A method of delay-modulating a signal waveform comprising:
- (a) generating a periodic pulse waveform,
- (b) position-modulating the pulses,
- (c) amplitude - modulating the position - modulated pulses in response to the signal waveform,
- (d) complementarily position-modulating the amplitude-modulated pulses to restore their periodicity, and
- (e) detecting the amplitude modulation of the pulses.

7. A method of delay-modulating a signal waveform comprising:
- (a) generating a periodic waveform of frequency substantially higher than any frequency in the signal waveform,
- (b) modulating the phase of the periodic waveform,
- (c) modulating the amplitude of the phase-modulated waveform in accordance with the signal waveform,
- (d) delaying successive cycles of the phase-and-amplitude-modulated waveform thus produced to restore the original periodicity while retaining the amplitude relation of successive cycles, and
- (e) producing a delay-modulated signal waveform in accordance with the resultant amplitude modulation.

8. A method of delay-modulating a signal waveform in accordance with a control waveform comprising the steps of:
- (a) generating a periodic waveform of frequency substantially higher than that of the highest frequency component of both the signal and control waveforms,
- (b) altering the phase of the periodic waveform in accordance with the control waveform to produce a phase-modulated waveform,
- (c) modulating the amplitude of the phase-modulated waveform in accordance with the signal waveform,
- (d) re-altering the phase to restore the original periodicity of the cycles while retaining the relative amplitude of successive cycles, and
- (e) producing a delay-modulated signal waveform in accordance with the resultant amplitude modulation.

9. A method of producing delay modulation of a signal waveform in accordance with a control waveform comprising the steps of:
- (a) producing pulses position-modulated about a fixed frequency by amounts corresponding to values of the control waveform,
- (b) modulating the amplitude of each pulse in accordance with values of the signal waveform,
- (c) delaying successive pulses so modulated by amounts complementary to the position-modulation to produce an amplitude-modulated periodic waveform, and
- (d) producing a delay-modulated signal waveform in accordance with the resulting amplitude modulation.

10. A method of producing modulated delay of a signal comprising:
- (a) producing a period waveform of frequency at least twice the highest frequency component of the signal,
- (b) delaying successive cycles of the waveform by amounts varying in accordance with a modulating waveform,
- (c) amplitude-modulating the delay-modulated waveform in accordance with the signal,
- (d) delaying successive cycles of the delay-and-amplitude-modulated waveform by amounts complementary to the original delay thereof to produce an amplitude-modulated periodic waveform and
- (e) producing an output delay-modulated signal corresponding to the amplitude modulation of the amplitude-modulated periodic waveform.

11. A method of producing modulated delay of a signal waveform in accordance with a control waveform comprising:
- (a) producing a constant-phase periodic waveform of substantially higher frequency than any frequency in the signal and control waveforms,
(b) modulating the phase of the periodic waveform in accordance with the control waveform,
(c) introducing the phase-modulated waveform and the signal waveform into a delay channel,
(d) altering the delay of said phase-modulated waveform and signal waveform in the delay channel complementarily to the phase variations of successive cycles of the phase-modulated waveform produced by the phase modulation to restore the constant-phase periodicity,
(e) and removing higher frequencies from the output of the delay channel to produce the delay-modulated signal waveform.

12. A method of producing modulated delay of a signal waveform in accordance with a control waveform comprising:
(a) producing a constant-phase periodic reference waveform of substantially higher frequency than any frequency in the signal and control waveforms,
(b) producing from the reference waveform and the control waveform a pilot waveform having successive cycles thereof delayed with respect to the reference waveform by amounts corresponding to values of the control waveform,
(c) and simultaneously and identically delaying the signal waveform and the pilot waveform by amounts complementary to the delays of respective successive cycles of the pilot waveform with respect to the reference waveform to delay-modulate the signal waveform.

13. A method of modulating a characteristic of a signal waveform in accordance with a control waveform comprising:
(a) producing a reference waveform having a constant value of said characteristic,
(b) modulating said characteristic of the reference waveform in accordance with the control waveform to produce a pilot waveform,
(c) comparing the pilot waveform and the reference waveform,
(d) and subjecting the signal waveform and one of said compared waveforms to modulation of said characteristic responsive to differences shown by said comparison to restore the identity of said characteristic in the compared waveforms and at the same time modulate the signal waveform in accordance with the control waveform.

14. A method of producing modulated delay of a signal waveform in accordance with a control waveform comprising:
(a) producing a constant-phase periodic reference waveform of substantially higher frequency than any frequency in the signal and control waveforms,
(b) producing from the reference waveform and the control waveform a pilot waveform having successive cycles thereof delayed with respect to the reference waveform by amounts corresponding to values of the control waveform,
(c) comparing the phase of the reference waveform and the pilot waveform,
(d) and simultaneously and identically delaying the signal waveform and one of said compared waveforms by amounts responsive to phase differences in the compared waveforms to eliminate such phase differences and at the same time delay-modulate the signal waveform.

15. A method of modulating the delay of a transmitted signal in response to values of a control signal comprising:
(a) producing a constant-phase fixed-frequency periodic reference waveform,
(b) producing from the reference waveform and the control signal a pilot waveform of the same average frequency as the reference waveform but delayed with respect thereto by amounts of time varied in response to the control signal,
(c) comparing the times of occurrence of cycles of the reference waveform and the pilot waveform,
(d) delaying the cycles of one of said waveforms in response to said comparison by the amounts of time required to produce a substantially constant time-interval relation of respective cycles of the waveforms, and
(e) simultaneously delaying instantaneous values of the transmitted signal by said latter amounts of time in response to said comparison to produce modulation of the delay thereof.

16. The method of claim 15 characterized by simultaneously performing the steps thereof in each of a plurality of channels employing a corresponding plurality of reference pulse-train waveforms of the same frequency but of differing constant phase, each pulse of the pilot waveform of each channel being delayed in response to the comparison by an amount restoring the constant phase, and the instantaneous values of the transmitted signal delayed in the respective channels being those occurring at times generally corresponding to the phase of the reference waveform, and combining the outputs of said channels.

17. In apparatus for delay-modulating a signal waveform in accordance with a control waveform, a delay circuit comprising:
(a) means for producing a periodic sawtooth waveform of fixed frequency,
(b) means to compare instantaneous values of the control waveform with instantaneous values of the sawtooth waveform and to sample and hold the signal value each time a predetermined relation is reached,
(c) means for producing, at a constant point of each sawtooth cycle, an output pulse of amplitude corresponding to the last sample, and
(d) means for detecting the amplitude modulation of the periodic pulse waveform thus produced to provide a delay-modulated signal waveform.

18. Apparatus for delay-modulating a signal waveform comprising a plurality of parallel-connected delay circuits as described in claim 17, respective sawtooth waveforms being of the same frequency but successively displaced in phase by equal phase intervals, so that the overall output is an amplitude-modulated periodic pulse train with pulse intervals shorter than the maximum range of delay.

19. The method of claim 13 characterized by producing a comparison signal responsive to differences shown by said comparison and modulating the signal waveform and said one compared waveform in response to the comparison signal.

20. The method of claim 14 characterized by producing a comparison signal responsive to phase differences shown by said comparison and delaying the signal waveform and said one compared waveform in response to the comparison signal.

21. The method of claim 14 wherein said one compared waveform is the pilot waveform and including delaying each cycle of the pilot waveform until the next occurrence of a predetermined portion of the cycle of the reference waveform, whereby the phase of the reference waveform and the pilot waveform is compared and said one of the compared waveforms is delayed as aforesaid.

References Cited

UNITED STATES PATENTS 2,952,812 9/1960 Klein, Jr. et al. ------ 332—17X

ROY LAKE, Primary Examiner

L. J. DAHL, Assistant Examiner

U.S. Cl. X.R.

332—17, 18